May 14, 1963 J. H. STEWARD 3,089,360
FEED HEAD
Filed March 25, 1957 6 Sheets-Sheet 3
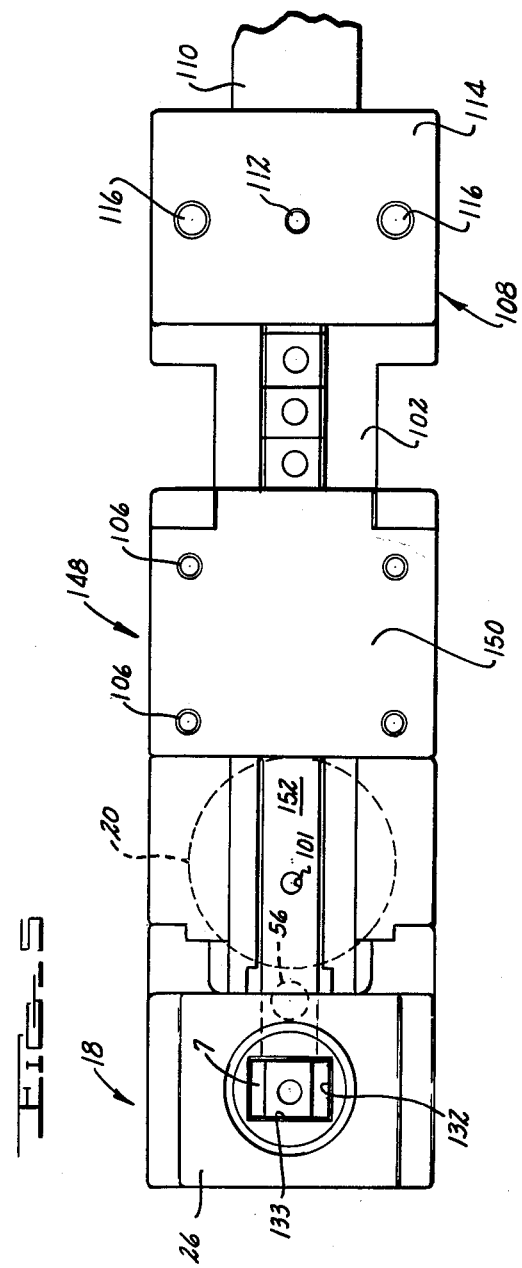
INVENTOR
JERRY H. STEWARD
BY
KOTTS & SHERIDAN
ATTORNEYS

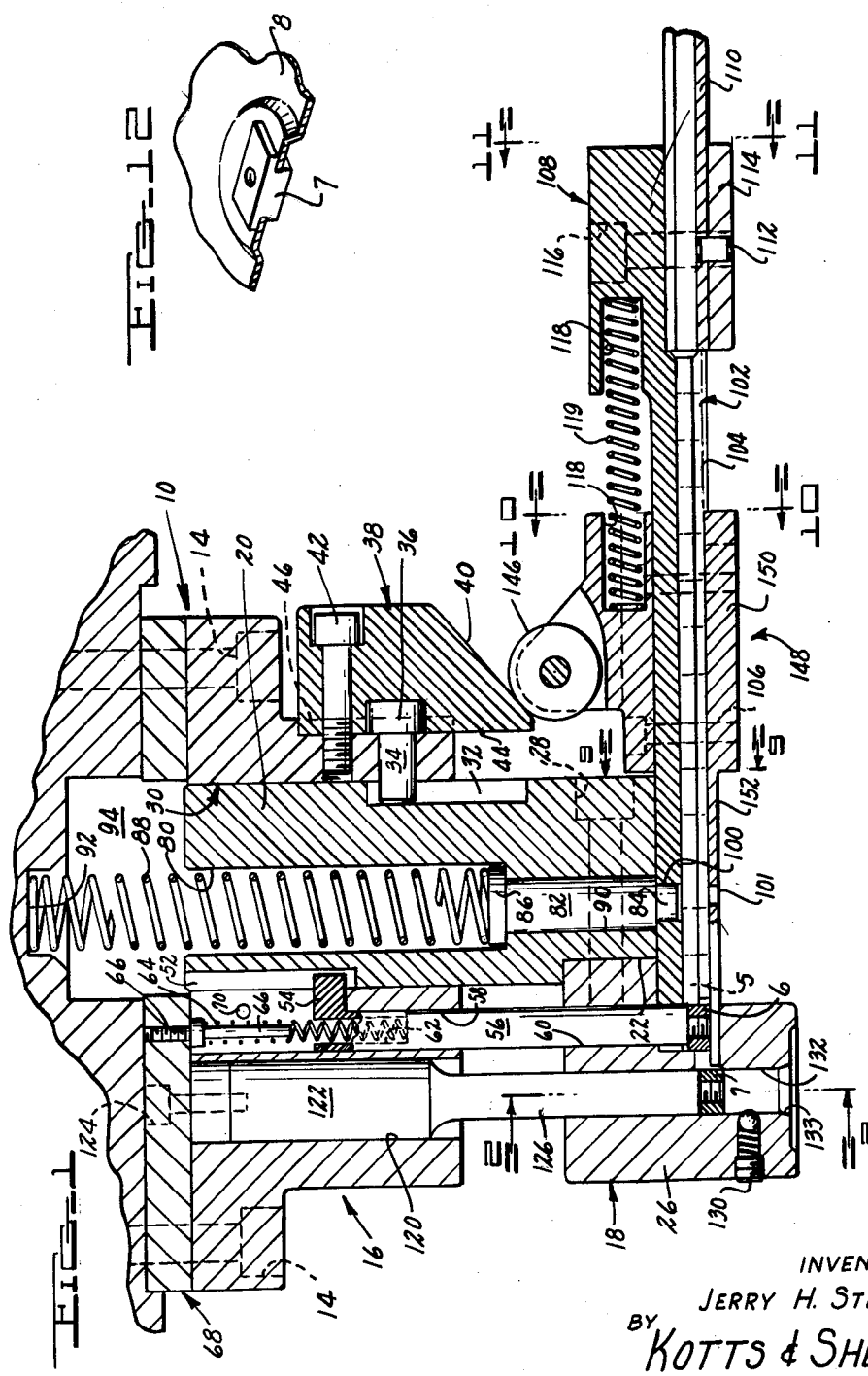

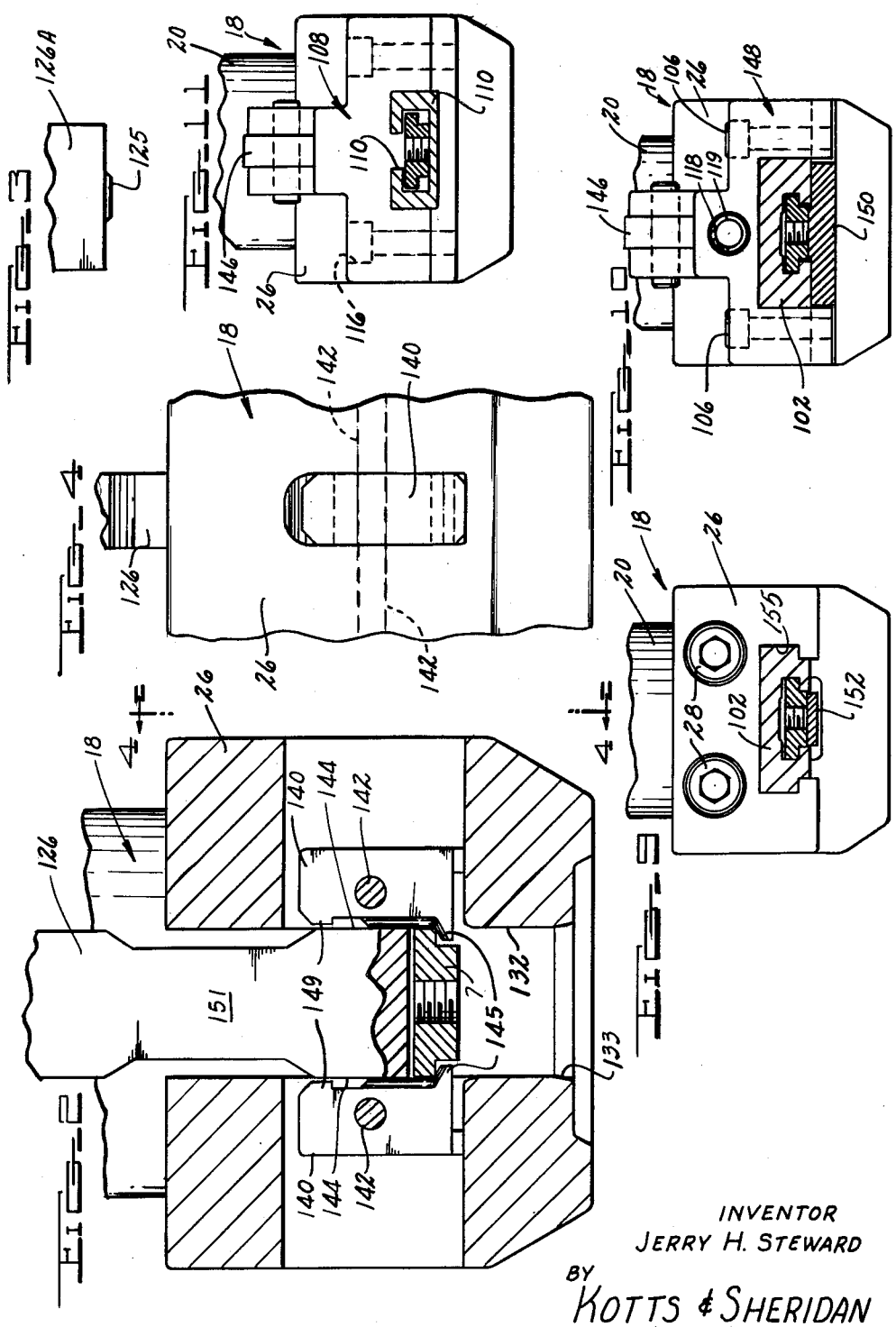

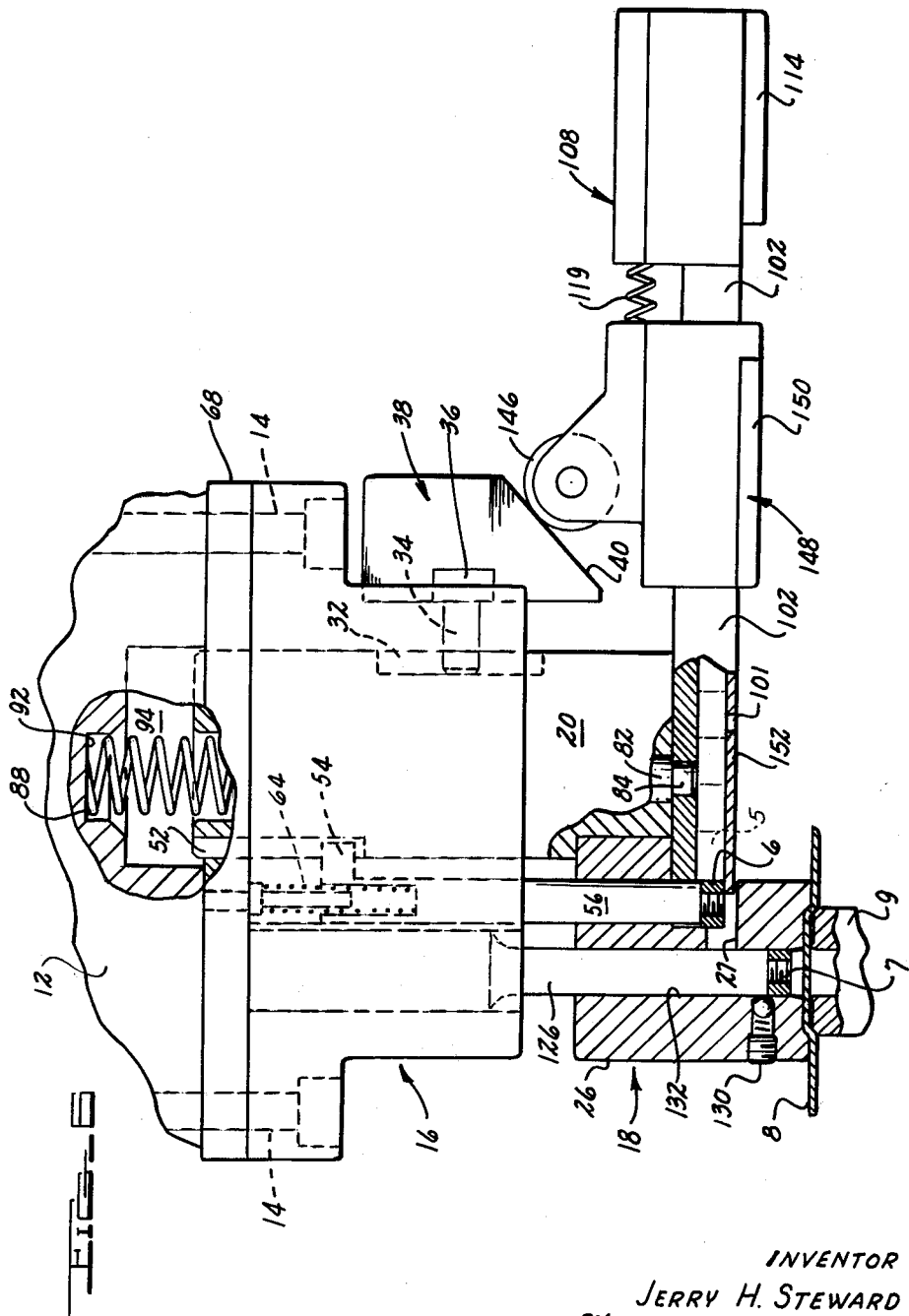

May 14, 1963 J. H. STEWARD 3,089,360
FEED HEAD
Filed March 25, 1957 6 Sheets-Sheet 5
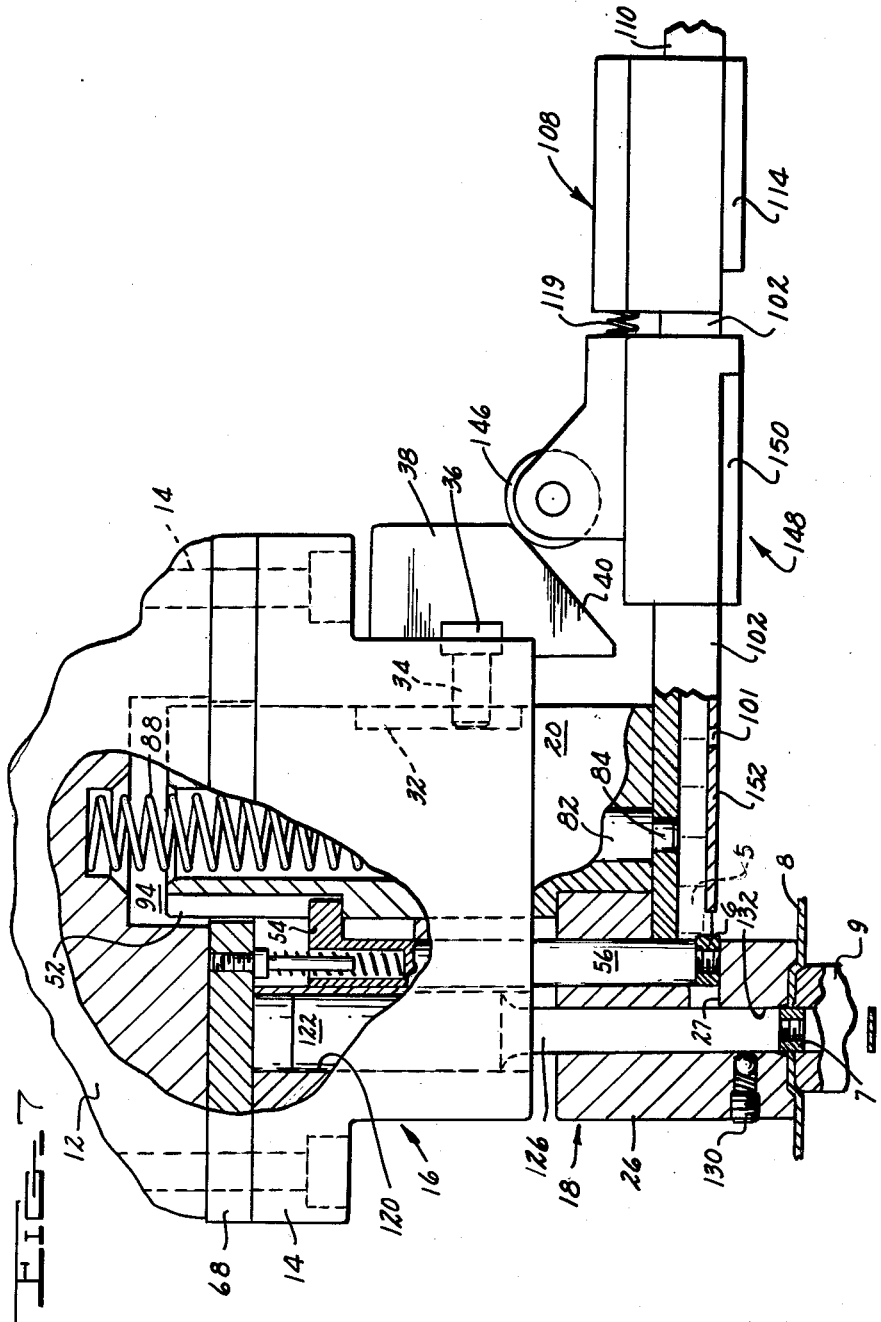
INVENTOR
JERRY H. STEWARD
BY KOTTS & SHERIDAN
ATTORNEYS

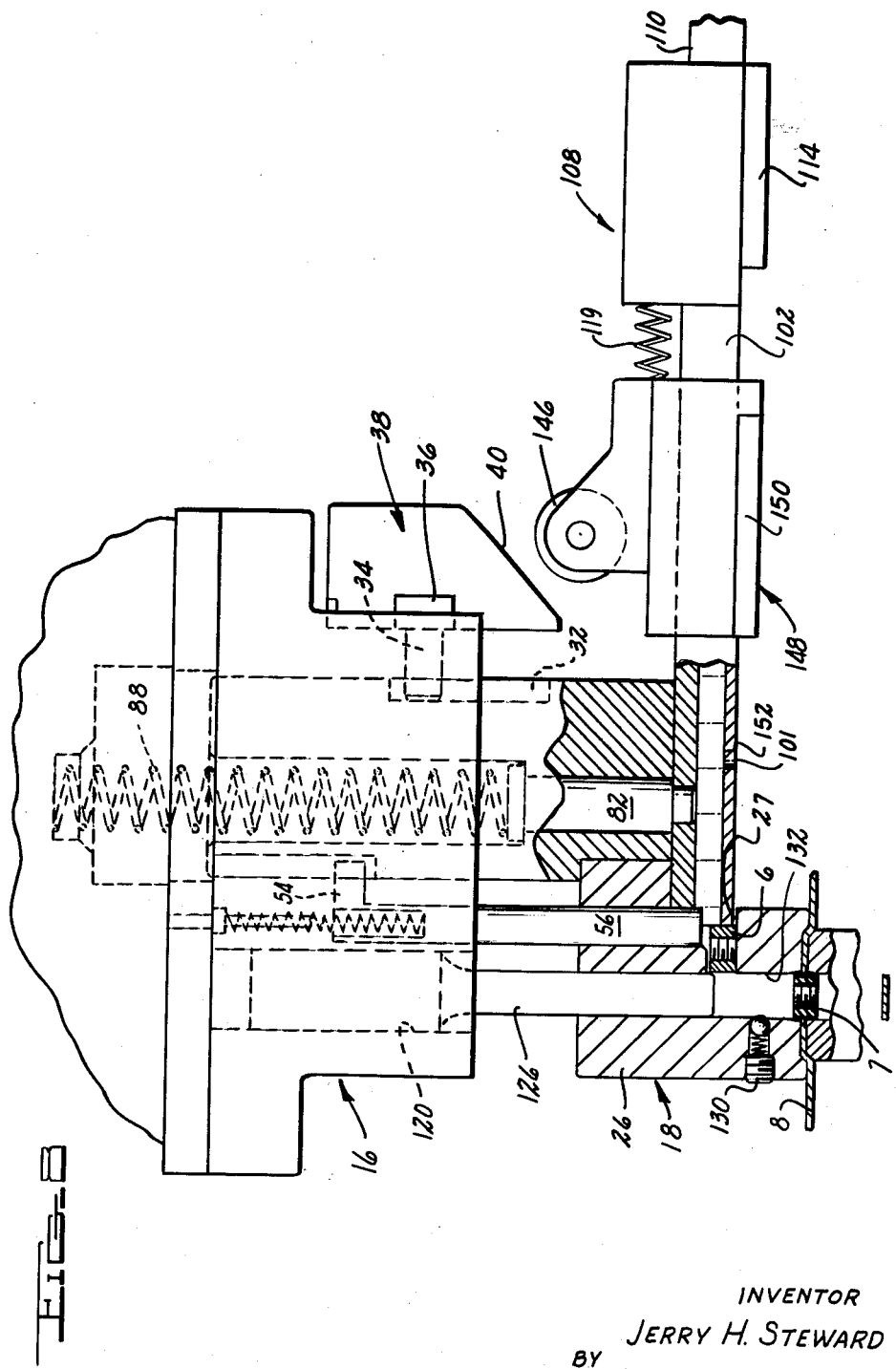

United States Patent Office 3,089,360
Patented May 14, 1963

3,089,360
FEED HEAD
Jerry H. Steward, Detroit, Mich., assignor to Multifastener Corporation, Redford, Mich.
Filed Mar. 25, 1957, Ser. No. 648,344
5 Claims. (Cl. 78—46)

This invention relates to an improved method and apparatus for affixing a clinch nut assembly to a sheet or panel.

In the past other devices of this nature have been developed using a nut or a similar part as a punch. However, the means used to hold the part prior to the affixing operation has not always proven entirely satisfactory. In most devices of this kind either a permanent magnet of a larger area than the part being held or an electromagnet of a similar area is provided for holding the part.

Metal chips are retained and remain in the threaded portion of the clinch nut as a result of the tapping operation. These chips are withdrawn once they come within the magnetic field of the clamping magnet, thus causing the succeeding parts to be spaced away from the surface of the clamping or holding magnet. The field intensity produced by a magnetic pole varies inversely with the square of the distance from the pole, and separation of the magnetic field from the clinch nut causes a reduction in the holding power of the magnet. This causes a shifting in position of the clinch nut when it is inserted under the magnet, which in turn causes serious misalignment of the parts. To correct this condition, production must stop so that the holding magnet can be cleaned to assure proper positioning of the successive parts. When such misalignment occurs, it is necessary to scrap the finished workpieces to which misaligned parts have been installed. Further, the misalignment may have been of such magnitude as to cause tool breakage. In today's era of mass production and labor and material cost, scrap, loss of production time, and the replacement of tools create a very undesirable condition.

The present invention provides a method and apparatus for elimination of the above condition.

Thus when a magnetic device is used for holding a part, the part must be fed into an exact position under the punch with respect to the magnet, wherein the present invention provides a non-restricted loading area, into which are fed commercial tolerance parts. When a magnetic device is used, an undersize part is not properly located, while an oversize part will not fit into the restricted loading area.

In the present invention a loading area is provided, in which commercial tolerance parts are sized in a sizing area and since there is no built up tolerance in this area, all parts moving through this sizing area are precision parts and are readily and properly positioned and affixed to a panel.

It is an object of the present invention to provide such an apparatus which will make possible an uninterrupted production schedule, and eliminate the necessity of constant shut-downs for the purpose of chip and dirt removal.

A further object of the present invention is the provision of an apparatus which will positively size, locate and hold the fastener part in proper position, and consequently eliminate scrap and tool breakage.

A further object of the present invention is the provision of an apparatus which will positively locate the fastener in the proper position, and securely position or swage the fastener in a panel in a single operation.

Another object of the present invention is the provision of a method of assembly which effects sizing, positioning, piercing and swaging of a pierce nut in a panel in a single operation.

Yet another object of the present invention is the provision of a method and apparatus utilizing a pierce nut to pierce an opening in a panel wherein standard size commercial tolerance nuts can be used.

Another object of the present invention is the provision of a self-contained feed head having parts which are easily accessible and readily interchangeable, which in turn results in low cost repairs when such repairs are necessary.

Another object of the present invention is the provision of a punch, having a boss, which will form a locking impression on the fastener to create a locknut in a single operation.

The foregoing and related objects are accomplished by the provision of an apparatus using a clinch nut type fastener having an enlarged body and a reduced body shank. This apparatus comprises a punch; a mechanical means for moving and holding the fastener under the punch, the reduced body shank of the fastener forming a piercing member; a die having an opening disposed beneath the piercing member, a panel member being positioned between the die member and the punch, and said punch in operation moving the fastener downwardly to pierce the panel member and swage the fastener to the panel in a single operation.

Other objects of this invention will appear in the following description and appended claims, reference being had to the accompanying drawings, forming a part of this specification, wherein like characters designate corresponding parts in the several views.

In the drawings:

FIG. 1 is a cross sectional view of my apparatus, the apparatus being shown in a partially closed position with the die member removed.

FIG. 2 is an enlarged section taken on line 2—2 in FIG. 1 with the punch completely retracted.

FIG. 3 is a fragmentary view of a modified punch.

FIG. 4 is an elevational view taken in the direction of line 4—4, FIG. 2.

FIG. 5 is a bottom plan view of my apparatus.

FIG. 6 is a side elevation, partly in section, showing an intermediate position as the apparatus moves downwardly.

FIG. 7 is a view similar to FIG. 6, showing the completely closed position of the apparatus.

FIG. 8 is a view similar to FIG. 7, showing an intermediate position of the apparatus moving upwardly.

FIG. 9 is a cross section taken on line 9—9 of FIG. 1.

FIG. 10 is a cross section taken on line 10—10 of FIG. 1.

FIG. 11 is a cross section taken on line 11—11 of FIG. 1.

FIG. 12 is a perspective view of a finished workpiece, with the panel member partially broken away.

Before explaining the present invention in detail, it is to be understood that the invention is not limited in its application and details of construction and arrangement of parts illustrated in the accompanying drawings, since this invention is capable of other embodiments and of being practiced or carried out in various ways. Also, it is to be understood that the phraseology or terminology employed herein is for the purpose of description and not of limitation.

Referring to the drawings, FIG. 1 illustrates a cross-sectional view of my feed head assembly embodying the invention. It will be readily understood that in the interest of simplicity, details of the hopper feed and the punch press have been omitted. Only the platen to which my device is affixed and the bed or anvil of the press will be referred to in the following specification, since this material is well known in the art and forms no part of the present invention.

The unit assembly 10 (FIG. 1) embodying my invention is affixed to the platen 12 of the punch press with several cap screws 14. The unit assembly comprises several larger parts, namely the upper housing assembly 16, the lower housing assembly 18 and guide post 20. The lower portion of the guide post 20 has machined therein a flat section 22, which is recessed or undercut at the outer edges and is held in engagement with a nose piece 26 by means of cap screws 28. The above construction provides a joined relationship with respect to the nose piece 26 and the guide post 20. The upper part of the guide post 20 works within a bore 30 and has machined therein a key slot 32. This key slot 32 engages a retaining pin 34 which has a head portion 36. The pin 34 is held in engagement with the key slot 32 by means of a cam track member 38, which is secured to the upper housing assembly 16 with a cap screw 42. The cam track member 38 has an inclined face 40, and a forward edge 44 which is contained within a key slot 46 in the upper housing 16.

Diametrically opposite the key slot 32 in the guide post 20 is a key slot 52 which receives a key 54. The key 54 forms a part of the clinch nut ejector and stop means 56, which works within a bore 58 of the upper housing 16 and within a bore 60 in the nose piece 26. The ejector pin 56 has a spring retainer bore 62 which receives a spring 64. The opposite end of the spring 64 is retained on spring guide pin 66, which is secured to the spacer plate 68 between the press platen 12 and the upper housing 16. A lubrication hole 70 is provided in the upper housing 16 to provide adequate lubrication of the ejector pin 56 and the guide post 20.

The guide post 20 has an off-center bore 80 which receives a flanged pin member 82 that seats in the bottom of the bore 80 and extends downwardly into a second bore 90. The lower end of the flanged pin 82, has a reduced diameter 84 which engages the lock pin hole 100 in the clinch nut feed chute 102. A hole 101 is provided in the tucker 152 to permit easy removal of the feed chute 102. Seated on the flange 86 of the flange pin 82 is a spring 88 which is confined by the platen 12 of the press and seated within spring seat 92. A clearance opening 94 is provided in the platen 12 and the spacer plate 68 to permit upward movement of the guide post 12.

Housed in a bore 120 in the upper housing 16, is a punch 122 which is secured at the upper end to the spacer plate 68 by screw 124, the lower end of the punch member 126 being of reduced size and shape required to fit the design of the part used.

The nose piece 26, which forms a part of the lower housing 18, has therein a spring-loaded ball detent device 130, which prevents the clinch nut from turning on its edge in the machined opening 132, prior to the piercing operation. The opening 132 has a flared portion 133 which permits the free movement of the nose piece 18 with respect to part after installation of the part in a panel. Also within the nose piece 18 are two cam fingers 140 (see FIGS. 2 and 3) mounted on pivots 142, which engage the cam track 144 on the lower end of the punch 126.

The feed chute 102, which is retained by the flange pin 82 on the upper surface, is keyed to the lower portion of the guide post 20 by means of a dovetail 155, machined therein (see FIG. 9). Slidably mounted on the feed chute 102, at the right of the guide post 20 is a roller type cam follower 146, which engages the cam track 40. Secured to the underside of the cam follower 146, is a tucker 148 (FIGS. 1 and 8) comprising a body portion 150 and a flat stem member 152 which works within the opening 104 of the feed chute 102. The tucker member 148 is secured to the cam follower 146 by means of two cap screws 106. On the right end of the feed chute 102 is an enlarged section 108 which is machined to receive the end of a hopper feed device 110. The end portion of the hopper feed device 110 is positioned by a pin 112, which is pressed into an opening in the cover member 114, to provide proper alignment of the parts supplied to the feed chute 102 from the hopper (not shown). The cover member 114 is secured by screws 116 to the enlarged section 108 of the feed chute 102. The enlarged section 108 of the feed chute and the cam follower 146, have machined therein a recess 118 to receive a compression spring 119. Having thus described the general construction and arrangement of parts, my device functions in the following manner.

With the workpiece or panel 8 in position over the die member 9 (FIG. 6), the platen 12 moves downward, the entire assembly 10 moving until such time as the movable nose piece 26 strikes the workpiece or panel 8. As this downward movement occurs, the lower housing assembly 18 stops and the cam follower 146 engages the cam track 40, thus causing a movement of the cam follower 146 to the right against the compression spring 119. This movement to the right starts the withdrawal of the tucker 152 from the underside of the clinch nut 6 (FIG. 6). The spring-loaded clinch nut ejector pin 56 now moves into engagement with the top of clinch nut 6. The punch 126 then moves the clinch nut 7, vertically down the sizing opening 132 in the nose piece 26. As the nose piece 26 strikes the workpiece 8 the guide post 20 moves up a sufficient amount to start compression of the spring 88 contained in the guide post within bore 80. As the punch 126 advances still further (FIG. 2), the flange on the fastener 7 moves down against the protrusions 145 on the fingers 140, and rotates the fingers about their pivots 142. Sufficient clearance is provided between face 149 and punch face 144 to accommodate this movement. As this action is started, the protrusions 149 on the tops of the fingers 140 move inwardly toward the reduced portion 151 of the punch 126, and the fastener 7 is released.

As the platen 12 moves down still further (see FIG. 6), the clinch nut 6 is about ready to be ejected over the end of the tucker stem 152. It will be noted that the ejector pin 56 has compressed the spring 64, and the tucker stem 152 remains partially under the clinch nut 6 and restrains its downward movement until the tucker stem is completely withdrawn.

When the unit assembly has reached its maximum downward movement (see FIG. 7), the tucker stem 152 has been entirely withdrawn, and the clinch nut 6 has moved into engagement with the horizontal surface 27 of the nose piece 26. The ejector pin 56 then acts as a stop means to block the opening from which the clinch nut 6 has come, and into which the next nut 5 is trying to enter. The clinch nut 7 is then advanced by the tucker 152 and sized in the opening 132 as the punch member 126 advances downwardly to pierce, stake and swage the clinch nut 7 into the workpiece 8. As the press advances downward the guide post 20 moves upward into the opening 94 and compresses the spring 88. This occurs while cam follower 146 is traversing the entire cam face 40 on the down stroke of the press.

During the upward or retracting cycle, the platen 12 moves up and the cam follower 146 moves to the left on cam face 40. The cam follower is held in contact with the cam face 40 by the spring 119. This movement causes the tucker stem 152 to move the clinch nut 6 towards the punch 126 which is retracting. The punch 126 acts as a stop for the advancing clinch nut 6 (see FIG. 8) and consequently the engagement of the clinch nut 6 with the tucker stem 152 and the punch 126 permits the cam face 40 to leave the cam follower 146. Once the punch 126 is completely withdrawn, the spring loaded tucker 148 will snap the clinch nut 6 into position under the punch 126 and another cycle will take place.

The part 6 which is waiting to be moved under the punch 126 (FIG. 7), when it has completely retracted, is about to be sized. The opening 132 in the nose piece 26 is of such width that it will receive an oversize clinch nut and precision size the same. With this in mind it can readily be seen that the part 7 which has been installed in the panel 8 is properly sized, this condition being possible because of the engagement of the tucker stem 152 and the clinch nut 7 against the nose piece wall before the punch 126 moved the part down the opening 132 (see FIG. 4). The tucker stem 152 extends into the opening 132 holds the fastener, the extension of the tucker stem 152 being such that the downward action of the press moves cam 40 into engagement with the follower 146 and moves the tucker stem 152 out of the way before the punch 126 engages it. By modifying the end of the punch 126a, as shown in FIG. 3 of the drawings, a locking thread can be installed on the first few threads of the clinch nut. To accomplish this, a deformation of the threaded part is caused by placing an extension 125 on the punch, thus forcing the first few threads to be slightly deformed when the punch strikes the die.

Since all movements are caused by press motion, it is impossible to install half nuts on a panel with my device. All parts move by action of the tucker 152 and are spring-loaded against the side wall 132 of the nose piece until moved downward by the punch 126. Should it be desirable to use multiple heads for applying nuts in various positions in a single panel, my device will work very successfully.

From the foregoing, it will be apparent that I have provided a unique method and apparatus which accomplish unusual results in a single step operation. The construction and arrangement of parts is such as to provide positive and efficient operation.

I claim:

1. In an apparatus for securing to a panel member a part having an enlarged body and a reduced body shank, a punch housing; a passage through said punch housing; a punch movable within said passage; a second opening intersecting said passage; two supporting fingers, one on each side of said passage; two pivot pins disposed in said second opening on which are mounted the supporting fingers, the pivot points being located above centerline on said supporting fingers; an upper and lower cam surface on each of said supporting fingers; a recessed cam surface on two sides of said punch; said fingers supporting the part as it is fed into the passage in the punch housing, said fingers releasing the part as said punch engages the lower cam surface on the supporting fingers, moving said fingers out of the punch path; the upper cam finger surface pivoting into the cam recess in the punch, as the punch moves downwardly against the part; as the punch moves upwardly, the upper cam surfaces on the supporting fingers engage the punch cam surfaces, pivoting the supporting fingers into a positive position for retaining a successive part.

2. A press type apparatus for securing a part to a panel member and having an enlarged body and reduced body shank, the combination of an upper housing adapted for attachment to a press; a punch housing positioned beneath said upper housing and movable relative thereo; a vertical opening in said punch housing; a punch slidably mounted within said vertical opening in said punch housing; a horizontal opening intersecting said vertical opening; two pivotal cam fingers mounted in said horizontal opening in said punch housing for positioning said part under said punch; said reduced body shank of the part forming a piercing punch member; pivotal means for supporting said cam fingers; cam means on said punch adapted to engage said cam fingers; said fingers retaining said part beneath said punch and releasing said part as the punch engages the cam fingers; a feed chute secured to said punch housing and movable therewith; a part feeder assembly slidably mounted on said feed chute; a cam follower positioned on said part feeder; a track in said upper housing in alignment with said feeder assembly; movement of the punch housing to engage said cam follower retracting part feeder assembly to accommodate the next successive part in the operating cycle; and a die disposed beneath said punch; said apparatus being arranged with a fastener and a panel member between said punch and said die, said fastener being applied to said panel in a single press operation.

3. A press type apparatus for securing a part to a panel having an enlarged body and reduced body shank portion, the combination of an upper housing adapted for attachment to a press; a punch housing beneath said upper housing and movable relative thereto; a punch rigidly secured in said upper housing and slidably mounted in said punch housing; a spring loaded stop pin for limiting movement of said parts within said punch housing prior to positioning below said punch; a horizontal feed chute operatively secured to said movable punch housing and movable therewith; a tucker slidably mounted on said feed chute; a cam follower positioned on said tucker and cooperable with a track in said upper housing; movement of the press downward causes said punch housing to engage the panel and the punch to move within the vertical opening in said punch housing; said cam follower retracting said tucker to advance and accommodate the next successive part into the punch housing opening; a pair of fingers and said punch housing, one on each side of said punch for holding said part; cam means on each of said fingers and said punch; said cam means on said fingers cooperable with said cam means on said punch to release the part as said punch moves against the panel; the part then being moved through the panel and swaged into position in a single press operation.

4. An apparatus for securing to a panel a part having an enlarged body and reduced body shank, the combination of an upper housing; a punch housing beneath said upper housing and movable relative thereto; a punch located within said punch housing; a horizontal opening in said punch housing; two pivotal cam fingers mounted in said punch housing for positioning said part under said punch; the reduced body shank of said part forming a piercing punch member; pivotal means for supporting said cam fingers; cam means on two opposed sides of said punch and adapted to engage said cam fingers; said fingers retaining said part beneath said punch and releasing said part as the punch engages the cam fingers; a substantially horizontal part feeding means affixed to said punch housing and movable therewith; a tucker slidably disposed on said part feeding means and retractable by contact of said punch housing with said panel; said retraction permitting the part to be moved downward from a ready position in the feeder above the tucker, to a position in front of the tucker, while upward movement of the punch releases the tucker to advance said part into operative position beneath said punch.

5. A press type apparatus for securing a part to a panel having an enlarged body and reduced body shank portion, comprising an upper housing adapted for attachment to a press; a punch housing beneath said upper housing and movable relative thereto; a punch slidable positioned in said upper housing which is slidable within said punch housing; a stop pin for limiting movement of said part within said movable punch housing prior to positioning beneath said punch; a feed chute operatively secured to said punch housing and movable therewith; a tucker member slidably mounted on said feed chute; a cam follower positioned on said tucker, actuation of said press causing said punch and punch housing to move downward as to engage the panel and thereby move the punch within said punch housing, while the part is moved into a panel member; said cam follower retracting said tucker to accommodate the next successive part in the operating cycle; a pair of pivotal supporting fingers in said punch housing actuated by said punch, one on each side thereof for holding said part in the operative position; cam means on each of said fingers and said punch; said fingers releasing said part as the punch moves against the panel member causing the punch to contact the cam means on said fingers, thereby releasing said part.

References Cited in the file of this patent

UNITED STATES PATENTS

| | | |
|---|---|---|
| 323,081 | Smith | July 28, 1885 |
| 1,190,803 | Rosenfeld | July 11, 1916 |
| 1,516,762 | Decker | Nov. 25, 1924 |
| 1,706,118 | Hopkins | Mar. 19, 1929 |
| 1,866,880 | Dellaree | July 12, 1932 |
| 2,186,841 | Rylander | Jan. 9, 1940 |
| 2,187,647 | Double | Jan. 16, 1940 |
| 2,215,388 | Butter | Sept. 17, 1940 |
| 2,230,518 | Weinhold | Feb. 4, 1941 |
| 2,335,670 | Harvey | Nov. 30, 1943 |
| 2,620,876 | Harness | Dec. 9, 1952 |
| 2,652,942 | Muchy | Sept. 22, 1953 |
| 2,799,188 | Newcomb | July 16, 1957 |
| 2,896,213 | Alderman | July 28, 1959 |

FOREIGN PATENTS

| | | |
|---|---|---|
| 324,280 | Great Britain | Jan. 23, 1930 |